United States Patent [19]
Nishitani

[11] 3,920,323
[45] Nov. 18, 1975

[54] APPARATUS FOR PROJECTING AN OBJECT

[75] Inventor: Tatsuro Nishitani, Tokyo, Japan

[73] Assignee: Nihon Kyozu Kabushiki Kaisha, Tokyo, Japan

[22] Filed: Oct. 18, 1974

[21] Appl. No.: 516,005

[30] Foreign Application Priority Data
Oct. 22, 1973 Japan.............................. 48-122606
Feb. 15, 1974 Japan.............................. 49-17685

[52] U.S. Cl..................................... 353/61; 353/66
[51] Int. Cl.².................. G03B 21/06; G03B 21/16
[58] Field of Search....................... 353/52–61, 353/65, 66, 67

[56] References Cited
UNITED STATES PATENTS
| | | | |
|---|---|---|---|
| 2,288,345 | 6/1942 | DeVry | 353/61 |
| 3,019,701 | 2/1962 | Bruechnor | 353/61 |
| 3,762,814 | 10/1973 | Kitch | 353/57 |
| 3,837,739 | 9/1974 | Altman | 353/66 |

FOREIGN PATENTS OR APPLICATIONS
| | | | |
|---|---|---|---|
| 1,153,914 | 9/1963 | Germany | 353/57 |

Primary Examiner—William D. Martin, Jr.
Assistant Examiner—A. Jason Mirabito
Attorney, Agent, or Firm—Michael S. Striker

[57] ABSTRACT

An apparatus for projecting an object is described. By installing in the apparatus a number of electric bulbs of comparatively lower voltage and larger current, this new type of apparatus for projecting an object can be used in the daytime by illuminating uniformly the overall face of the object capable of placing on the top of the apparatus with a very large volume of rays. Also, in order to eliminate the increased temperature in the apparatus, the ventilating arrangement is provided.

4 Claims, 10 Drawing Figures

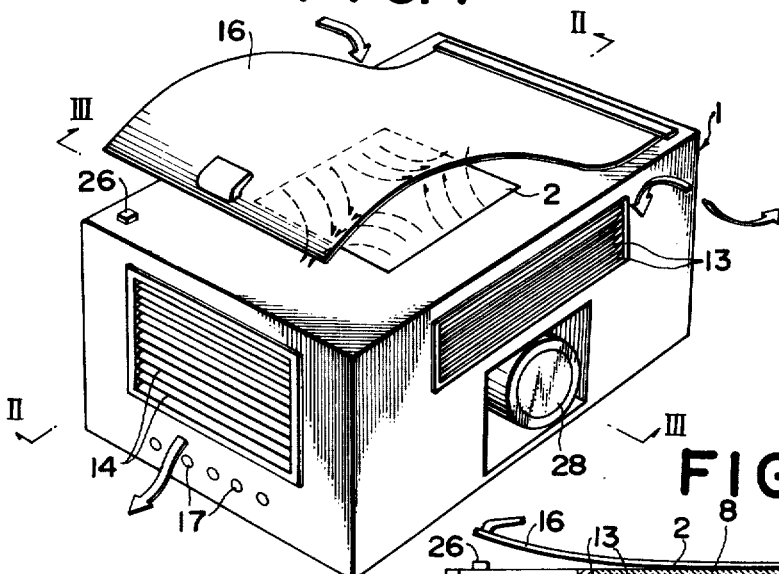
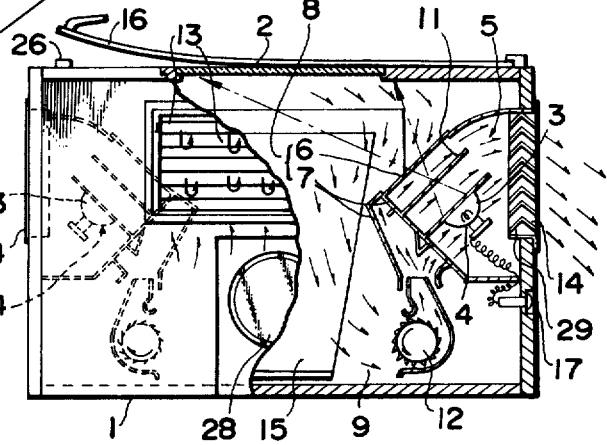
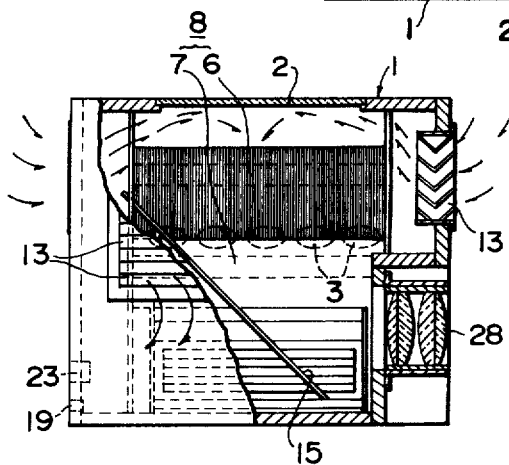

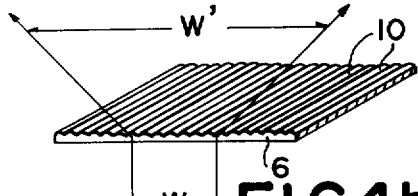
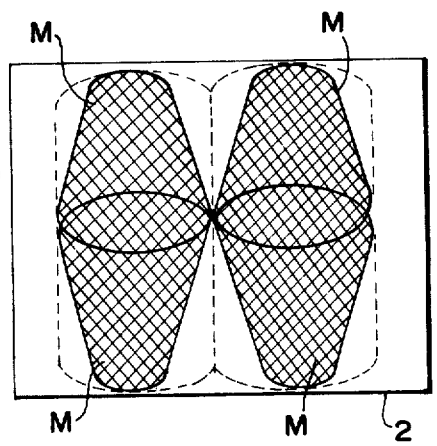
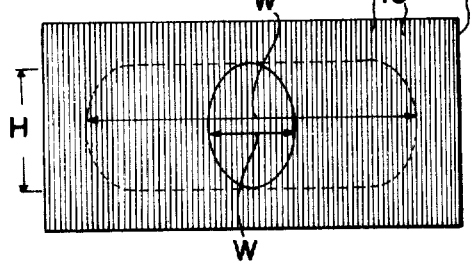
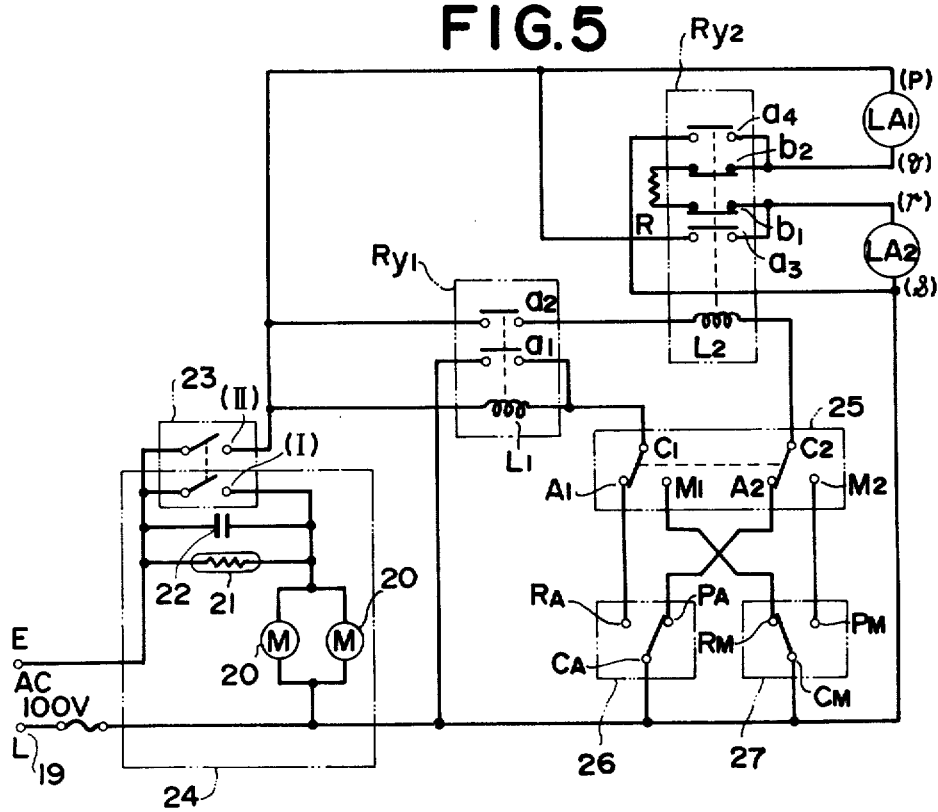

APPARATUS FOR PROJECTING AN OBJECT

BACKGROUND OF THE INVENTION

The present invention relates to a new type of apparatus for projecting an object. In the conventional apparatus of this sort an object is enlarged and projected on the screen by means of reflected rays, so that a strong light is required. Because of the strong light the temperature within the apparatus is increased highly. Also, there is a possibility that the real object may be burnt by increased heat being generated by the strong light. Moreover, in comparing with the apparatus for projecting on the screen the rays of light passing through a film like in a slide projector or an overhead projector, the screen of the conventional type of apparatus for projecting is smaller in area and tends to become darker. On account of such an inconvenient defect it has become difficult to employ said apparatus in the daytime.

The apparatus for projecting an object is of the most remarkable feature that a special medium like a transparent film is not needed, and that any object that one wants to project can be projected as it is. Nevertheless, because of the inconvenient defect described above, till now no apparatus for projecting an object, which is capable of satisfying the practical use, is not being produced yet. In order to overcome the aforegoing disadvantage, the present invention has been achieved.

The main object of the present invention is to provide the new type of apparatus for projecting an object, which can be used in the daytime by illuminating uniformly the overall face of the object placed on the apparatus with a very large volume of rays, while arranging in the apparatus a number of electrical bulbs of comparatively lower voltage and larger currency.

Another object of this invention is to provide the apparatus for projecting an object, which makes it possible to project the object on the screen without any loss of ray volume by installing in the apparatus a special device for dispersing uniformly the rays which is capable of attaining an uniform illumination, while arranging a number of electric bulbs as described above.

Another object of this invention is to provide the apparatus for projecting an object that even if one or some of many electric bulbs installed in the apparatus will be disconnected, the disconnection can be detected visually by means of an indicating lamp.

Another object of this invention is to provide a special arrangement so that the inner mechanism of the apparatus or the object itself placed on the top of said apparatus can not be damaged or burnt due to the rapid increase of the temperature in the apparatus which is caused by illuminating the object with the strong rays of light. As far as this special arrangement is concerned, a space for installing a light source and a passing space of rays capable of reflecting the object as a result of the illumination generated from the electric bulbs are provided separately to each other. And by actuating a fan installed at the place partitioning the former from the latter, the outer air is inhaled from the inlet of the passing space of rays, while the heated air is exhausted from the outlet of the space for installing a light source. In order to attain the aforegoing function, the arrangement of ventilation is a very essential factor for this apparatus.

Therefore, it is another object of this invention to provide the apparatus for projecting an object to which is attached a ventilation arrangement having very little leakage of rays.

Another object of this invention is to provide the apparatus of an excellent durability for projecting an object, which is capable of maintaining longer the life span of electric bulbs having a strong illuminating power, which is declined by the repeat of switch-on and switch-off.

A further object of this invention is to provide at the top of the apparatus a surface for placing an object, and a cover.

These and other features and advantages of this invention will be better understood from the following detailed description of one exemplary embodiment thereof taken in conjunction with the accompanying drawings, wherein:

BRIEF DESCRIPTION OF THE DRAWINGS

FIG. 1 is an overall perspective view showing an exemplary embodiment of the apparatus for projecting an object.

FIG. 2 is an elevational view thereof taken along the line II—II of FIG. 1.

FIG. 3 is a side view thereof taken along the line III—III of FIG. 2.

FIG. 4a and FIG. 4b are a perspective view of and an elevational view of a plate for dispersing rays of light laterally.

FIG. 4c is an elevational view for indicating the distribution of brightness on the surface for placing an object.

FIG. 5 is a circuit diagram of the apparatus according to the present invention.

DETAILED DESCRIPTION OF THE INVENTION

Figure 6:
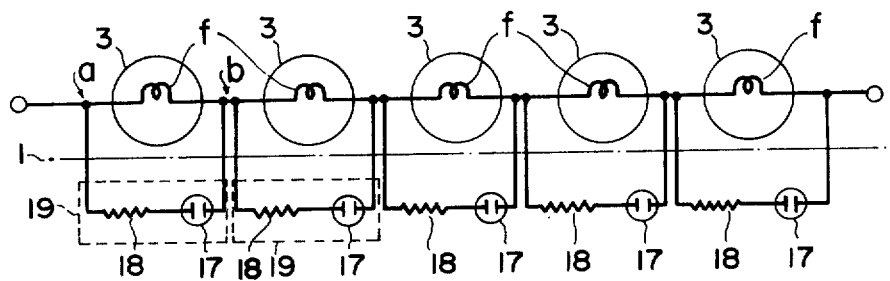
FIG. 6 is a circuit diagram of electric bulbs of the apparatus.

The structure of the apparatus according to the present invention will now be described in accordance with the accompanying drawings.

Numeral 1 denotes a box-shape body of the apparatus for projecting an object. Numeral 2 denotes a portion of a transparent glass being formed at the top of the body 1, and the portion 2 is provided for placing various kinds of objects. Numeral 3 is one of a plurality of halogen electric bulbs which are installed within the body of the apparatus. The electric bulb 3 has a concaved mirror 4 capable of recieving the heated rays including infrared rays and reflecting visible rays condensedly. And the condensed rays caused by the concaved mirror 4 can be illuminated to the portion 2 for placing an object. Numeral 5 denotes a space for installing a light source, which is placed at both the left and right sides of the body 1 or at the rear thereof if necessary. The space 5 for installing a light source is enclosed by a portion 8 consisting of a transparent plate 6 for dispersing rays and a frame 7. Thus, the space 5 is separated from a passing space 9 of rays.

The transparent plate 6 for dispersing rays is located in front of the electric bulb 3 and at the back of the portion 2 for placing an object. As shown in FIG. 4a, the transparent plate 6 is of semi-circular projecting portions which are provided longitudinally to each other, and extended laterally. Therefore, when the rays of light pass through the transparent plate 6, they are dispersed. And the portion 2 for placing an object can be illuminated slopewisely by the dispersed strong rays of light having passed through the transparent plate 6.

Numeral 11 denotes a filter absorbing infrared rays, which is installed between the electric bulb 3 and the transparent plate 6 for dispersing rays. The function of the filter 11 is to pass through the visible rays and to absorb the heated rays. Numeral 12 denotes a drum type fan which is located in the frame 7 and on the boundary between the space 5 for installing a light source and the passing space 9 of rays. When the drum type fan 12 is actuated, the air can be transferred to the space 5 for installing a light source from the passing space 9 of rays. The arrow marks in FIG. 2 indicates the flow of air. Numeral 13 denotes an inlet inhaling the outer air, which is located on the external wall of the body 1. The inlet 13 is connected to the passing space 9 of rays. Numeral 14 denotes an outlet for exhausting the heated air, which is also located on another external wall of the body 1, and is connected to the space 5 for installing a light source. Numeral 15 is a reflecting mirror which is provided in the passing space 9 of rays. By means of the reflecting mirror 15 the rays of light reflected from the object can be transferred to the lens device 28. Accordingly, the object is enlarged. Numeral 16 denotes a cover which is located at the portion 2 for placing an object. The object can be hidden there by the cover 16.

On the basis of the aforementioned structure of the apparatus, the operational function and effect will be now described hereinafter.

After an object to be projected is placed on the portion 2 for placing it, it is hidden by the cover 16. The condensed rays generated from the electric bulb 3 are passing through the filter 11 absorbing the infrared rays, and then are dispersed by the transparent plate 6 having a number of semi-circular projecting portions 10. Then, the rays dispersed by the transparent plate 6 are illuminated to the object placed on the body.

Since the semi-circular projecting portions 10 of the transparent plate 6 for dispersing rays have the function capable of making rays enlarge, as shown in FIGS. 4a and 4b, the rays of light incident upon the transparent plate 6 with the width of W are dispersed to the larger width W' after passing therethrough. On the other hand, the longitudinal size H is the same. If the transparent plate 6 for dispersing rays is not applied, four portions M become brighter concentratively as shown in FIG. 4c, but the other area is not bright enough. In this case, the portion 2 for placing an object is illuminated slopewisely by four electric bulbs. Under such a circumstance the object is not projected on the screen with the uniform brightness. However, since the transparent plate 6 for dispersing rays is applied in this exemplary embodiment, the rays of light are uniformly illuminated to the overall portion for placing an object. As shown in FIG. 4c, the portion enclosed by the dotted line is illuminated uniformly by the dispersed rays of light. Thus, the rays reflected from the object are incident upon the reflecting mirror 15 whereby the direction of the rays is changed. Finally, the object is projected and enlarged on the screen with a very uniform brightness.

As described previously, the body 1 is divided into two portions with the partitions 8 consisting of the transparent plate 6 for dispersing rays and the frame 7. And by means of the radiating function of the electric bulbs, the temperature in the space 5 for installing a light source is highly increased, and the heated air tends to remain therein. On the other hand, the temperature in the passing space 9 of rays is maintained lower than that in the space 5.

For the sake of preventing heating in the body 1, the arrangement of ventilation is provided. First, by means of the actuation of the cooling fan 12, the outer air is inhaled from the inlet 13, and then fed to the passing space 9 of rays in which the temperature is maintained lower. Then, the air is passing through the space 5 for installing a light source, whereby the heated air remaining in the space 5 can be exhausted from the outlet 14. Owing to such a ventilation described above, the temperature in the body of this apparatus can be kept constantly at the appropriate state.

Figure 7A:
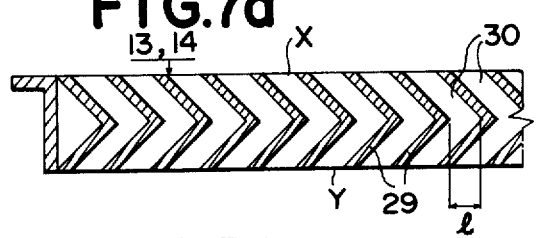
FIG. 7a and FIG. 7b are the enlarged section views indicating two exemplary embodiments of the arrangement of ventilation.

In the preferred form, the body 1 of the apparatus for projecting an object is made in a form of a rectangular box and the air inlet and outlet 13 and 14 are constructed so that a plurality of light shielding fins 29, each being as shown in FIG. 7a, folded in the shape of a letter V, are arranged side by side at a position of V for the inlet 13 and at a position of reverse V for the air outlet 14. In this way a very efficient cooling can be carried out as follows:

As indicated by the arrows in the Figures, the cooling air which is introduced in the body 1 through the inlet 13 having V-shaped fins 29 are firstly blown up towards an object-placed portion 2 in the space 9 through which illuminating rays pass. After cooling the portion, the air immediately flows down and cools the inside of the body 1 and a reflecting mirror 15 by heat exchange. The slightly warmed air current is suctioned in a drum type fan 12, blown into the space of high temperature, in which a light source consisting of a plurality of electric bulbs are mounted, and cool the space effectively. Then, the thus heated air is discharged downwards through the outlet having reverse V-shaped fins. The described cooling process is very efficient because cooling air flows very smoothly without stagnating so that continuous cooling can be carried out. Consequently, the heat generated by the electric bulbs can be very efficiently removed without stagnating in the wall-partitioned space in which the electric bulbs are installed and transmitting unexpectedly to the other spaces. For this reason, as an advantage, a considerably powerful light source is usable for projecting an object at higher luminance.

The light shielding V-shaped fins 29 are arranged side by side to form air apertures 30 curved in such a way that the openings X and Y at both ends of an aperture are not viewable in the straight line. The curved apertures 30 serves as a curtain against the light but not block the passage of air. No direct invasion of the light through the curved apertures occurs since the rays of light inevitably run against anywhere of the light shielding fins 29.

Likewise it is possible to prevent the illuminating rays from directly running out of the body 1 without blocking the passage of air.

Figure 7B:
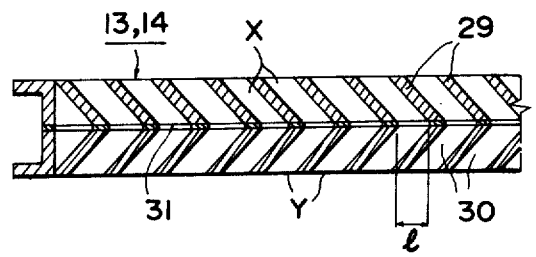

The light shielding fins 29 are, as shown in FIGS. 7a and 7b, made integrally or by joining with an adhesive 31.

The characteristic construction and function of parts in an embodiment of the present invention are hereinafter described.

Firstly concerning electric bulbs of the light source 3 useful for such an apparatus for projecting an object provided with a collective reflector or lens, an electric bulb of equal output and to be supplied with lower voltage has a thicker and shorter filament and consequently is generally advantageous compared with a similar electric bulb to be applied to higher voltage because a thicker and shorter bulb filament, owing to its higher mechanical strength, not only secured a longer useful life of the electric bulb but also owing to that the electric bulb is closer to a point light source, enables to become a greater collective power of rays, as a result a clearer reflection being produced. From the abovementioned, electric bulbs to be supplied with lower voltage are used in this embodiment.

Also such an apparatus for projecting an object generally requires a very strong illumination because of as a rule big object to be projected, consequently its area to be illuminated being great.

Also in this embodiment, no big transformer is necessary for illumination, though a plurality of electric bulbs to be exposed to low voltage are used, because they are connected in series with each other, consequently electric current being small. For example five halogen bulbs of 100 W/h, 20 V which are connected in series with each other can provide a great clearness of reflection in average than does a similar halogen bulb of 500 W/h, 100 V, since for one reason the collective effect of a reflecting concave mirror 4 on an electric bulb of 20 V can be greater than that on an electric bulb of 100 V owing to that the filament is closer to a point light source and for another reason a halogen lamp has a characteristic that if output is equal to the luminous flux from the bulb is greater at lower voltage, consequently greater current.

The above described construction that a plurality of electric bulbs of lower watt/h and lower voltage 3 are connected in series with each other however has an inevitable inconvenience of use that if anyone of the electric bulbs is burned out, all the bulbs 3 are shut off the current and consequently it is necessary to check up one by one for searching the burned out bulb.

In this embodiment, in order to remove such inconvenience, a mechanism 19 for indicating a burned out bulb, which consists of an indicating neon lamp 17 and a high resistance 18 for stabilizing the indicating neon lamp, both being connected in series with each other, is connected in parallel to each electric bulb. It is particularly desired that the indicating neon bulbs 17 are so arranged as to be peepable from the outside and that each bulb is correspondent to the attached lamp. In the illustrated example in which for instance five electric bulbs 3 of 100 W/h and 20 V 3 having a relatively thick filament $f$ are connected in series with each other, it is desired that the high resistance 18 for stabilizing the indicating lamp is selected to be such a value that the indicating lamps 17 can light between 50 and above 75 V.

Subsequently the function of this lamp source is described. Each electric bulb 3 of 100 W/h, and a relatively low voltage of 20 V, consequently the greater current has a thicker filament. For this reason the collective effect of the concave 4 is greater and an uniform clearer illumination can be realized. Thanks to the serial connection of the five electric bulbs, the electric ends of each bulb is subjected to a low voltage of 100 V × one fifth = 20 V.

In the mechanism for indicating a burned out bulb 19, which is arranged in parallel to each electric bulb 3, when an electric bulb is on the correspondent indicating neon lamp 17 does not light because the voltage which apply to it is less than the voltage necessary for its discharge. Then no electric energy is consumed by ones other than the electric bulbs. For example, if a halogen bulb 3, such as the halogen lamp on the left end of the circuit in FIG. 6 burns out, the current is shut off and a voltage of 100 V is applied between the terminals $a$, $b$ of the burned out bulb. Consequently to the correspondent indicating neon lamp 17 is applied for example a voltage of about 75 V which is necessary for the discharge, in consideration of the voltage fall by the high resistance 18 for stabilizing the indicating lamp. In this way, the correspondent indicating neon lamp 17 lights, and thereby the burned out bulb can be indicated. This enables to instantly replace it with a new electric bulb.

The construction and functions of the circuit in this embodiment are hereinafter described.

First of all an input, a motor for rotating fan 12, a thermostat and a protective condenser are indicated with numerals 19, 20, 21 and 22 respectively. A double switch 23 which is the main swithc is mounted in a desired position in the body 1. The abovementioned motor circuit 24 across a pole I is formed. On the other hand, another pole II is connected through the exciting coil $L_1$ of a relay $RY_1$ to a pole terminal $C_1$ of a double throw-change over switch 25 for switching automatic or manual operation to each other. The automatic operation contact $A_1$ of the switch 25 is connected to a contact $R_M$ of an automatic switch 26. The common terminal $C_A$ of the automatic switch is connected to the line L of the input. The automatic switch 26 is connected as a micro-switch interlockable with a light shielding cover 16 of the object placing portion 2. The manual operation contact $M_1$ of the change over switch 25 is connected to the contact $R_M$ of the manual switch 27, and the common terminal $C_M$ of the manual switch 27 is connected to the L line of the input 19. The exciting coil $L_1$ of Relay $RY_1$ is supplied with the voltage across the contact $a_1$ to form a self-maintaining circuit.

The pole II of the double throw switch 23 is connected to another pole terminal $C_2$ of the change over switch 25 across another contact $a_2$ of the relay $RY_1$ and the exciting coil $L_2$ of the relay $RY_2$. The automatic operation contact $A_2$ of the change over switch 25 is connected to the contact $Pa$ of the automatic switch 26 and another contact $M_2$ of the change over switch 25 is connected to the contact $P_M$ of the manual switch 27.

The common contact $C_A$ of the automatic switch 25 is connected to the II terminal of the main switch 23 across in series a group of electric bulbs $LA_2$ and a contact $b_1$ of the relay $RY_2$, a resistance R, another contact $b_2$ of the relay $RY_2$ and finally another group of electric bulbs $LA_1$ to form a serial circuit. Moreover both groups are composed to form the abovementioned light source 3. Further a connection from an end of the group $LA_1$ to an end $r$ of the group across a contact $a_3$ of the relay $RY_2$ and another connection from another end $s$ of the group $LA_2$ to another end $q$ of the group $LA_1$ across a contact $a_4$ of the relay $RY_2$ are constructed.

Now if the light shielding cover 16 is opened, the common terminal $C_A$ of the automatic switch 26 turns to the contact $R_A$, as a result electric current through the exciting coil occurrs and the contact $a_1$ closes to form the self maintaining circuit. Then the light shielding cover 16 is yet remained open, the contact $C_A$ is not connected to the contact $P_A$ of the automatic switch 26, the exciting coil $L_2$ of the relay $RY_2$ is shut off the current and relay $RY_2$ is still not actuated. Consequently the serial connection between both groups of electric bulbs $La_1$ and $La_2$ is maintained. Then if an object to be projected is placed on the object placing portion 2 and the light shielding cover 16 is closed, in turn the automatic switch which is microswitch is actuated by the cover 16, the contact $C_a$ is connected to the contact $P_A$, an electric current through the exciting coil $L_2$ of the relay $RY_2$ occurs.

Then the contacts $b_1$ and $b_2$ of the relay $RY_2$ open and simultaneously the contacts $a_3$ and $a_4$ close, consequently both groups of electric bulbs $LA_1$ and $LA_2$ being connected in parallel to each other. Then the so-called rated voltage is applied to each electric bulb 3, thus the desired high illumination for projection is obtained.

After completion of a projection, if the cover 16 is again opened from the object placing portion 2, the automatic switch 26 returns to the same $C_A$–$R_A$ connection as before the projection. The contacts $C_a$ and $P_A$ are disconnected from each other, the exciting coil $L_2$ of the relay $RY_2$ is shut off the current. Then the contacts $a_3$ and $a_4$ open and simultaneously the contacts $b_1$ and $b_2$ close, consequently the groups of electric bulbs $LA_1$ and $LA_2$ being again connected in series with each other. In this way the illumination again lowers to the extent sufficient to light the neighborhood of an operator.

The same operation as abovementioned is manually carried out as follows:

After the change over switch 25 is turned to the manual operation, that is to the contacts $M_1$ and $M_2$, the same change over between parallel and serial connection as done by the automatic switch 26 can be carried out by operating the manual switch 27. If under connection between the terminal $C_M$ and the contact $P_M$ of the manual switch 27 the main switch 23 is turned on, the exciting coil $L_1$ is shut off the current, consequently the self-maintaining circuit being not form. Then the groups of electric bulbs $LA_1$ and $LA_2$ are connected in series with each other. To the contrast under a condition of connection between the terminal $C_M$ and contact $R_M$ of the manual switch, a current through the exciting coil $L_1$ of the relay $RY_1$ occurred thereby the self maintaining circuit is formed. However because of disconnection between the terminal $C_M$ and contact $P_M$ of the manual switch 27, the exciting coil $L_2$ of the relay $RY_2$ is shut off the current, the relay $RY_2$ is not actuated, and the groups $LA_1$ and $LA_2$ is remained in serial connection.

Subsequently after an object is placed on the fixed position, the manual switch 27 is turned to the contact $P_M$, thereby the terminal $C_M$ and the contact $P_M$ is connected with each other, the relay $RY_2$ is actuated and after all the groups of electric bulbs $LA_1$ and $LA_2$ are connected in parallel to each other in such a way as abovementioned. Thus, a powerful illumination is obtained.

During the period of a projection, for example the input terminal 19 is shut off the power source by mistake, or the fuse is cut off by melting, as a result upon the projecting apparatus being shut off the power source, immediately the self-maintaining circuit of the relay $RY_1$, simultaneously the exciting coil $L_2$ of the relay $RY_2$ is shut off the current and consequently the groups of electric bulbs $LA_1$ and $LA_2$ is again connected in series with each other to turn to the condition before projection.

Therefore when projection is resumed, the parallel connection by which the fixed illumination for projection is obtainable is not realized without passing through the weak lighting by the serial connection. In this way bad influence of the inrushing current can be suppressed.

After completion of a projection, though the main switch opens, a thermostat 21 is in the state of conduction as long as the inside of the body 1 is remained above the fixed temperature by heat generated from the groups of electric bulbs $LA_1$ and $LA_2$ so that a fan motor 20 continues to rotate. If the inside temperature of the body 1 falls less than the fixed temperature, the thermostat 21 opens and the fan motor 20 is blocked from the power supply and stops.

The apparatus for projecting an object according to the present invention has the following remarkable advantages:

The apparatus is constructed in such a way that the groups of electric bulbs $LA_1$ and $LA_2$ can be connected both in parallel to and series with each other by intermediation of the relay $RY_2$, the self-maintaining relay circuit is interposed in the exciting circuit of the relay $RY_2$, whereby the groups of electric bulbs $LA_1$ and $LA_2$ are not connected in parallel to each other without passing through the state of serial connection when actuated by any of the automatic switch 26 interlocked with the cover 16 of the object placing portion 2 and the manual switch 27. Therefore, it is not necessary to turn on and off the electric bulbs whenever projection starts or an object is replaced by another. Then the inrushing current generated when the input terminal 19 is reconnected to the power source after shutting off the same is suppressed and the illumination is so low that only the neighborhood of an operator is seeable. As a result, not only an appreciably longer life of the electric bulbs 3 is brought about but also the eyes of an operator or viewers are protected. Besides useless consumption of electric power when projection is not performed can be saved.

While certain preferred embodiment of the invention have been specifically illustrated and described, it will be understood that the invention is not limited thereto as many variations will be apparent to those skilled in the art, and the invention is to be given broadest interpretation within the terms of the following claims.

What is claimed is:

1. In an apparatus for projecting the image of an object, of the type comprised of a housing body, a place for locating an object whose image is to be projected, and optical means including at least one electric illuminating bulb, a reflector and a projecting lens arrangement so positioned relative to each other and relative to said place for locating an object as to together define a path for illuminating light, a cooling arrangement, comprising, in combination, divider means dividing the interior space of said housing body into a first space containing said electric illuminating bulb and into a second space accommodating the major portion of said path for illuminating light; means defining a ventilation outlet communicating with said first space and a ventilation inlet communicating with said second space; and fan means mounted intermediate said first and second spaces and operative for drawing cooling air in through said inlet and through said second space to cool the latter and for discharging such air into said first space and out through said outlet for cooling said illuminating bulb.

2. In an apparatus as defined in claim 1 wherein at least one of said ventilation inlet and outlet is defined by an arrangement of folded fin plates arranged side by side to form air apertures but spaced from each other at such distances and so disposed relative to each other as to block the passage of light in a straight line through said arrangement of folded fin plates.

3. In an apparatus as defined in claim 1 wherein said divider means includes a transparent light-dispersive enlarging plate arranged in the path of the light emitted from said at least one illuminating bulb intermediate such bulb and said place for locating an object.

4. In an apparatus as defined in claim 1 wherein said optical means includes a plurality of such electric illuminating bulbs, said bulbs being electrically connected with each other in series, and further including a plurality of indicating circuit units, one for each of said electric illuminating bulbs, each indicating circuit unit being comprised of a respective indicating lamp electrically connected to the respective one of said bulbs and circuit means operative for causing the indicating lamp to become illuminated when the associated illuminating bulb becomes inoperative.

* * * * *